United States Patent Office 3,042,917
Patented July 3, 1962

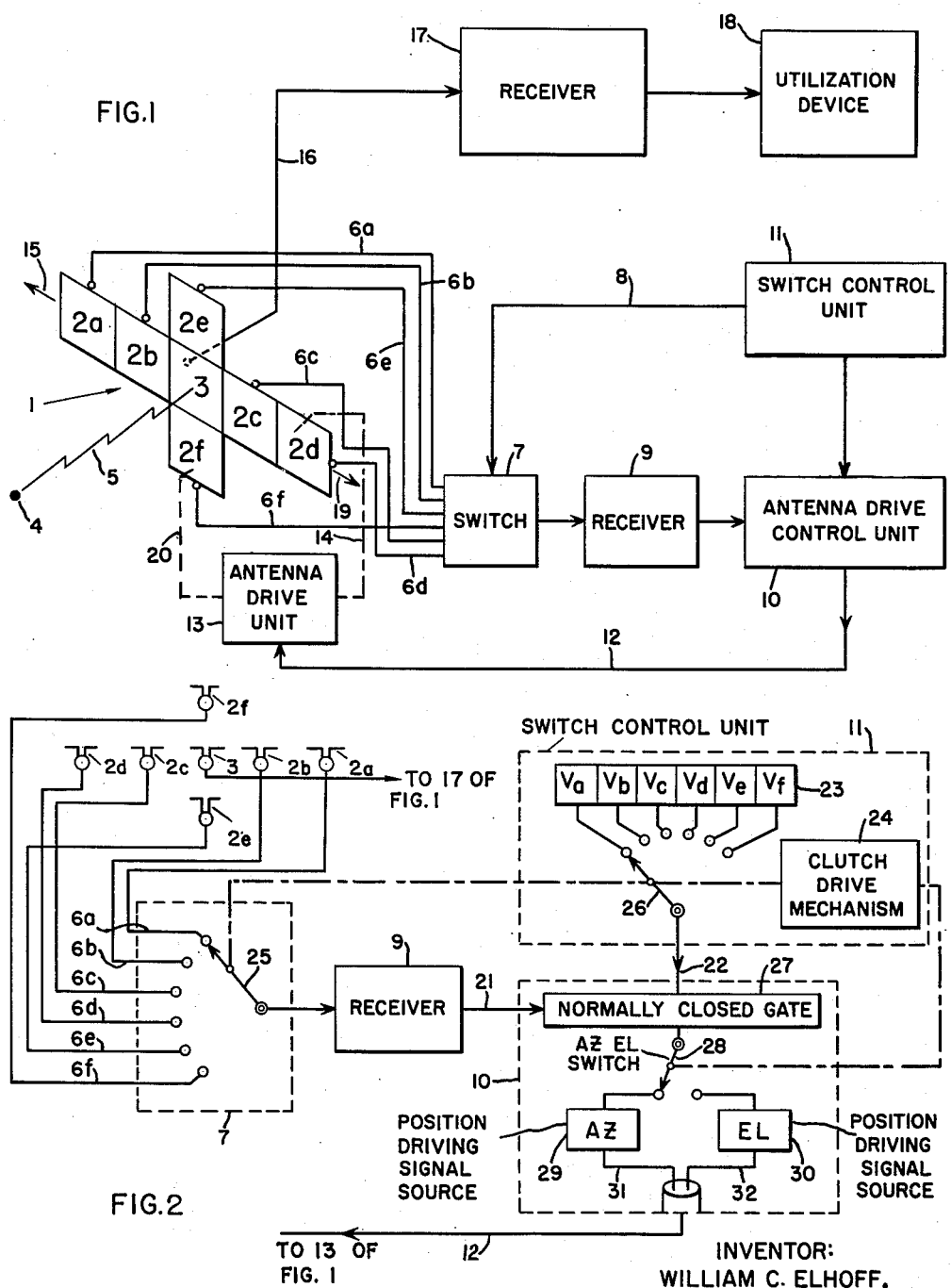

3,042,917
ANTENNA TRACKING SYSTEM
William C. Elhoff, Constantia, N.Y., assignor to General Electric Company, a corporation of New York
Filed Dec. 22, 1958, Ser. No. 782,193
2 Claims. (Cl. 343—117)

This invention relates to a method and apparatus for positioning objects in response to control signals and particularly to a method and arrangement for positioning directive signal receiving apparatus to follow the direction from which signals are being received from a remote source.

In certain fields, for example, communications, etc., systems exist for positioning signal receivers to coincide with the direction of arrival of signals from a remote source. Many of these systems suffer from the disadvantages that they make use of complex and expensive components and require considerable attention to be maintained in an effective operating condition. Many of these systems also suffer from the disadvantage that their acquisition coverage is limited; that is, the system can, at any one time, acquire signals from only a limited solid directional angle of arrival.

It is therefore an object of my invention to provide a simple and inexpensive method and arrangement for positioning signal receiving apparatus to follow the direction of arrival of signals from a remote source.

Another object of my invention is to provide an improved signal following system.

A further object of my invention is to provide an improved arrangement for positioning a directive beam antenna to follow the direction of arrival of signals received from a remote source.

A further object of my invention is to provide an antenna following system with improved acquisition coverage.

A further object of my invention is to provide an improved signal control arrangement and method.

In a particular embodiment of the invention, there is provided a system for positioning a controlled, directive beam antenna to follow the direction of arrival of signals, such as electromagnetic waves, from a remote source. Briefly, the arrangement comprises a source of a plurality of controlling, movable, directive beam antennas for receiving signals from the remote signal source, the directivity of each of the beams of said antennas being fixed but different with respect to one another. The term "beam" as used herein means the directivity pattern of an antenna. In the arrangements disclosed, these patterns are directive, i.e., they have a direction of most efficient reception. Means are provided for causing the controlled beam to acquire and follow the direction of arrival of signals from the signal source. Said means comprises an arrangement for sampling the signals received in each of said plurality of beams in a predetermined manner with time to derive respective sampled signals. A driving action is produced in response to the existence of a predetermined or maximum sampled signal and the relative position of said controlled beam with respect to the controlling beam associated with said maximum signal. The driving action is then employed to adjust the azimuth and elevation position of said controlled beam to receive or acquire the signals from said source.

The features of the present invention which are believed to be novel are particularly pointed out in the appended claims. In the drawings, FIG. 1 illustrates one embodiment of the invention in part block diagram, part schematic form employing a plurality of controlling beam antennas for controlling the angular position of a controlled beam antenna which is intended to receive signals from a remote object.

FIG. 2 illustrates in detailed part block diagram, part schematic form methods and apparatus for carrying out the invention illustrated in FIG. 1.

Referring to FIG. 1, there is shown an antenna assembly 1, which will be described in detail shortly, comprising a plurality of positionable, directive controlling beam antennas 2a, 2b, 2c, 2d, 2e, 2f, and a source of a positionable, directive controlled beam antenna 3. Antenna assembly 1 is adapted to receive signals from a source of remote signals, for example 4, having a predetermined range, elevation and azimuth with respect to the antenna assembly 1. Signals emanating from source 4 are shown schematically by 5 on their way to being received by the antenna assembly 1. It is desired to have the directive beam 3 follow the direction of arrival of signals 5 from source 4. If source 4 is movable with respect to antenna assembly 1, use is made of the several controlling beams 2 to redirect the beam 3 to follow the direction of arrival of signals 5. Each of the beams associated with antenna assembly 1 has a fixed but different directivity with respect to one another. Briefly, if the beam antenna 3 does not acquire a signal 5, one of the controlling beams 2 is intended to acquire such signal and effect the re-positioning of the antenna assembly 1. Signals received in each of the controlling beams 2 are sampled in a programmed or predetermined manner with time and a predetermined or maximum signal received in one of such controlling beams results in producing an appropriate driving action to cause the antenna assembly 1 to be positioned so that the controlled beam 3 once again acquires signals 5. For purposes of illustration, let us assume that the signals 5 are being received in the controlling antenna 2a and not in any of the other beams. The signal acquired in beam antenna 2a is applied over connection 6a to a switch 7 where, at a predetermined time, it is gated or switched under control of signals available over 8 to the signal receiver 9. The output from receiver 9 is applied to an antenna drive control unit 10. The switch control signal available on lead 8, which enables the sampled antenna signal to be applied to the receiver 9, is generated in a switch control unit 11. Simultaneously with the switching of the received signal to the receiver 9 to the control unit 10, unit 11 causes the control unit 10 to deliver an appropriate positioning signal over lead 12 to the antenna drive unit 13. The unit 13 may comprise an azimuth angle drive motor which responds to the positioning signal available on cable 12 to drive the antenna assembly 1 in the direction 15 by means of mechanical linkage 14. As the antenna assembly 1 is driven in the direction 15, the signal 5 is next received in the controlled beam 2b and at an appropriate time this signal available on lead 6b is switched by switching circuit 7 under control of signals available on 8 to the receiver 9 for application to the antenna drive control unit 10. As before, simultaneously with the application of the signal available on 6b to the control unit 10, switch control unit 11 causes the unit 10 to deliver a signal over cable 12 to the antenna drive unit 13 causing the motion of antenna assembly 1 in direction 15 to be continued such that ultimately the signal 5 is acquired in beam antenna 3. Upon receipt of the signal 5 in beam antenna 3, the signal is applied directly over lead 16 to a receiver 17 where it is detected and applied to a utilization device 18 which may comprise a recorder, monitor, indicator, etc. It is desired that once the signal 5 has been acquired in antenna 3, that such signal continues to be received by receiver 17 and operate the utilization device 18. It is possible that the signal 5 is next acquired in the beam antenna 2c, either due to overshoot of the antenna positioning or a relative movement of the signal source 4 with respect to the antenna assembly 1. At an appropriate time the signal acquired by 2c is applied over lead 6c by means of switching circuit 7 through the receiver 9 to the control unit 10 under the control of the switching signal available on lead 8. Simultaneously with the application of the output signal from receiver 9 to control unit 10, the switch control unit 11 causes control unit 10 to deliver a signal over cable 12 to the antenna drive mechanism 13 to cause the antenna assembly 1 to be driven in the direction 19. This driving action causes the beam antenna 3 to once again acquire the signals 5 being transmitted by source 4. Thus, once a signal 5 is received in beam antenna 3, continued reception of this signal by antenna beam 3 is obtained. The antenna assembly 1 position continues to be adjusted as the signals 5 continue to be received within the azimuth angle defined by the beams of 2b and 2c.

While the arrangement has been described thus far as affecting azimuth position control of the antenna by means of mechanical linkage 14, the arrangement operates in a similar manner to provide elevation positioning of antenna 1 by means of mechanical linkage 20. This elevation mechanical linkage may be associated with an elevation angle drive motor in the antenna drive unit 13, which motor responds to signals provided over cable 12 from the control unit 10. Once the signal 5 has been received in beam 3, the antenna assembly position continues to be adjusted as the signals 5 continue to be received within the elevation angle defined by the controlling beams 2e and 2f. The net result of this antenna assembly positioning is to cause beam 3 to continue to acquire the signals 5 for purposes of operating the utilization device 18.

Referring to FIG. 2, there is shown in greater detail one embodiment of the present invention for deriving on lead 12 the control signals necessary to position the antenna assembly 1 both in elevation and in azimuth. Wherever possible, use has been made of common reference numerals to define structures common to FIGS. 1 and 2. Reviewing briefly, the antenna drive control unit 10 functions to deliver appropriate azimuth and elevation drive controlling signals over cable 12 in response to a predetermined or maximum signal being received from receiver 9 and in accordance with certain information delivered from the switch control unit 11 over lead 22. In one embodiment the switch control unit 11 comprises a plurality of sources of voltage 23 wherein each of the voltages Va, b, c, d, e and f are associated with a respective lead 6a, b, c, d, e and f associated with the controlling beam antennas 2a, b, c, d, e, and f respectively shown as spaced apart directive dipoles. Let us assume that signals 5 are being applied to lead 6a. Unit 11 comprises a swicth drive mechanism 24 which drives switches 25 and 26 in synchronism to select leads 6a, b, c, d, e and f and corresponding respective voltages Va, b, c, d, e, f from sources 23. Mechanism 24 also causes switch 28 to select the azimuth or elevation position driving signal sources 29 or 30 depending upon whether leads 6a b, c, d or leads 6e, f have been selected by 25. Let us assume that the drive mechanism 24 is selecting the signal being received on lead 6a and is applying the voltage Va to lead 22. The signal 5 appearing on 6a is applied by switch 25 to receiver 9, then over lead 21 to the normally closed gate circuit 27. In its normally closed position, gate circuit 27 prevents any of the position voltages V from passing through the gate circuit to switch 28 and hence to lead 12 to drive the antenna assembly 1. However, upon receipt of the signal 5 on lead 21, the normally closed gate 27 operates and applies the signal Va to the switch 28. Since the voltage Va is associated with azimuth positioning control, switch drive mechanism 24 has caused the switch 28 to connect the output of the gate circuit 27 to the azimuth position driving signal source 29. Source 29 may constitute an amplifier for amplifying the gated voltage Va to a suitable level before application to lead 12, or may substitute a suitable voltage for this purpose. The azimuth driving signal from 29 is then applied over lead 31 to cable 12, which in turn applies the driving signal to the azimuth drive motor of the antenna drive unit 13. The azimuth driving signal on cable 12 causes the azimuth motor to drive the antenna assembly in a predetermined manner, as for example continuously or in discrete steps as long as azimuth positioning signals are available on cable 12. Subsequently, switch drive mechanism 24 drives switches 25 and 26 into contact with lead 6b and source Vb respectively. Since these correspond to azimuth positioning controls, the switch 28 is connected to source 29 as before. In response to a predetermined or maximum receiver output signal on lead 21, the normally closed gate now operates to pass the signal Vb to source 29, which in turn results in a driving signal being applied over lead 12 to the azimuth antenna drive motor in unit 13. It has been assumed that the signal 5 which had previously been received in 6a is now being received in 6b. However, in the event that no signal 5 is being received in 6b, then the normally closed gate 27 would remain closed, resulting in no driving signal being applied over cable 12, and therefore maintaining the antenna assembly in its last azimuth position. In a similar manner it can be shown that the switches 25 and 26 are driven into contact with lead 6c, 6d, and voltage sources Vc and Vd to produce azimuth driving signals on lead 12 only in those situations where a predetermined or maximum signal is received in 9 and applied over lead 21 to open the normally closed gate 27. When switches 25 and 26 are driven into contact with leads 6e and the source Ve, respectively, mechanism 24 drives switch 28 to connect with the elevation position driving signal source 30. If a predetermined or maximum receiver output signal appears on lead 21, gate 27 is opened, gating the voltage Ve on lead 22 to the switch 28 for application to 30. Source 30, in a manner similar to source 29, applies an elevation driving signal over lead 32 to cable 12. Cable 12 in turn applies the driving signal to the elevation drive motor of the antenna drive unit 13. The elevation driving signal on cable 12 causes the elevation motor to drive the antenna assembly 1 in a predetermined manner as long as elevation positioning signals are available on cable 12. Subsequently switch drive mechanism drives switches 25 and 26 into contact with lead 6f and source Vf respectively. Since these correspond to elevation positioning controls, the switch 28 is connected to source 30 as before. In the manner previously described, the gate circuit operates in response to a predetermined or maximum receiver output signal to cause signals from source 30 to drive the antenna assembly 1 in the proper elevation direction to permit acquisition of signal 5 by beam 3. If no such receiver output signal appears, then the gate 27 is closed, resulting in no driving signal being applied over cable 12 and therefore maintaining the antenna assembly in its last elevation position.

In one embodiment, the beam antennas receiving the received signals from 5 may be spaced to give 3 db adjacent antenna beam cross-over levels at the middle of the operating frequency band. The receiver 9 may comprise a signal amplitude threshold detector or contain appropriate signal characteristic recognition circuits, such as frequency, pulse width, pulse repetition rate, frequency modulation detectors, etc., which deliver an output only in response to a predetermined level and/or type of detected signal characteristic. The voltages Va, Vb, Vc may be D.C. voltages having an amplitude determining the tracking rate and having a polarity determining the tracking direction. Restated in a general way, a given antenna assembly control voltage polarity would be associated with, for instance, the controlling beam antennas located to the right and above the controlled beam antenna. In the same way, the opposite control voltage polarity would be associated with signals received in the controlling beam antennas located to the left and below the controlled beam antenna. These polarities, applied to the azimuth and elevation drive motors, would determine the direction of rotation of said motors and, thereby, the tracking direction of the antenna assembly.

In conjunction with these polarity assignments, a different control voltage amplitude would be associated with each one or group of the controlling beam antennas.

The antenna assembly tracking drive rate would be made proportional to the control voltage amplitudes applied to the azimuth and elevation drive motors. In this way, by assigning a larger control voltage potential to the controlling beam antennas whose directives are furthest away from that of the controlled beam antenna, the antenna assembly tracking rate will be proportional to the difference between the instantaneous angular direction of the antenna assembly and the instantaneous angular direction of the signal source.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a first, controlled, positionable, directive beam antenna for receiving signals from a remote signal source, a plurality of second, controlling, positionable, directive beam antennas for receiving signals from said signal source, the directivity of each of said second antennas being different but fixedly spaced with respect to one another, a source of a plurality of controlling signals, each of said controlling signals being associated with a respective one of said second antennas, first anntenna positioning means, means for sequentially sampling the signals received in each of said second antennas in a predetermined manner with time to derive sampled signals, means responsive to a maximum intensity characteristic of said sampled signals for applying the respective controlling signal associated with the anntenna producing said maximum sampled signal characteristic to said first antenna positioning means, said first antenna positioning means responsive to the polarity of said applied controlling signal for driving said first antenna in a direction to receive signals from said signal source and responsive to the intensity of said applied controlling signal for driving said controlled antenna at a rate dependent upon the relative linear separation between said first antenna and the second antenna associated with said last-named controlling signal.

2. In combination, a source of a first, directive wave receiving beam for receiving waves from a remote wave source, a source of a plurality of second, directive wave receiving beams for receiving waves from said wave source, the directivity of each of said beams being different but fixed with respect to one another, beam positioning means, a source of a plurality of controlling signals, each of said controlling signals being associated with a respective one of said controlling beams, means for sequentially sampling the waves received in each of said second beams to provide sampled waves, means responsive to a predetermined intensity of a characteristic of said sampled waves for applying the respective controlling signal associated with the beam providing said predetermined intensity wave characteristic to said beam positioning means, said beam positioning means responsive to the polarity of said applied controlling signal for driving said first beam in a direction to receive signals from said wave source and responsive to the intensity of said applied controlling signal for driving said second beam at a rate dependent upon the relative linear separation between said first beam and the second beam associated with said applied controlling signal.

References Cited in the file of this patent

UNITED STATES PATENTS

| | | |
|---|---|---|
| 2,423,104 | Labin | July 1, 1947 |
| 2,427,029 | Stearns | Sept. 9, 1947 |
| 2,513,849 | De France | July 4, 1950 |
| 2,700,156 | Sunstein | Jan. 18, 1955 |
| 2,929,058 | Blasberg et al. | Mar. 15, 1960 |